US007953373B2

(12) United States Patent
Karabinis

(10) Patent No.: US 7,953,373 B2
(45) Date of Patent: *May 31, 2011

(54) PREDICTION OF UPLINK INTERFERENCE POTENTIAL GENERATED BY AN ANCILLARY TERRESTRIAL NETWORK AND/OR RADIOTERMINALS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/575,714

(22) Filed: Oct. 8, 2009

(65) Prior Publication Data

US 2010/0041395 A1    Feb. 18, 2010

Related U.S. Application Data

(63) Continuation of application No. 11/295,383, filed on Dec. 6, 2005, now Pat. No. 7,634,234.

(60) Provisional application No. 60/636,592, filed on Dec. 16, 2004.

(51) Int. Cl.
*H04B 17/00* (2006.01)
(52) U.S. Cl. ..... 455/67.11; 455/3.02; 455/1; 455/114.2; 455/278.1
(58) Field of Classification Search ............... 455/67.11, 455/1, 3.02, 114.2, 278.1, 296, 405, 63.1, 455/115.1, 423, 447
See application file for complete search history.

(56) References Cited

U.S. PATENT DOCUMENTS

| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |

(Continued)

FOREIGN PATENT DOCUMENTS

EP    0 506 255 A2    9/1992
(Continued)

OTHER PUBLICATIONS

Ayyagari et al., "A satellite-augmented cellular network concept", *Wireless Networks*, Vo. 4, 1998, pp. 189-198.

(Continued)

*Primary Examiner* — Minh D Dao
(74) *Attorney, Agent, or Firm* — Myers Bigel Sibley & Sajovec, P.A.

(57) ABSTRACT

Methods are provided for predicting uplink interference potential to a mobile satellite system (MSS) generated by ancillary terrestrial components (ATCs) of an ancillary terrestrial network (ATN) and/or ATC radioterminals that are configured to terrestrially use/reuse satellite frequencies that are used and/or authorized for use by a MSS. The methods include measuring power transmitted by and/or received at one or more radioterminals communicating with one or more terrestrial networks and/or transmitted by and/or received at the one or more terrestrial networks communicating with the one or more radioterminals using terrestrial frequencies that are at least partially outside a range of the satellite frequencies. Uplink interference potential to the MSS generated by terrestrial use/reuse of satellite frequencies by the ATN and/or the ATC radioterminals is predicted responsive to the measured power. Related ancillary terrestrial networks are also described.

27 Claims, 4 Drawing Sheets

U.S. PATENT DOCUMENTS

| | | |
|---|---|---|
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,420,993 B1 * | 7/2002 | Varon ............................. 342/36 |
| 6,449,461 B1 | 9/2002 | Otten |
| 6,498,934 B1 * | 12/2002 | Muller ......................... 455/450 |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman |
| 6,785,543 B2 | 8/2004 | Karabinis |
| 6,801,515 B1 * | 10/2004 | Ishikawa et al. .............. 370/342 |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 * | 9/2006 | Karabinis ..................... 455/427 |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 7,599,656 B2 | 10/2009 | Karabinis |
| 7,603,081 B2 | 10/2009 | Karabinis |
| 7,603,117 B2 | 10/2009 | Karabinis |
| 7,606,590 B2 | 10/2009 | Karabinis |
| 7,609,666 B2 | 10/2009 | Karabinis |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153308 A1 | 8/2003 | Karabinis |
| 2004/0072539 A1 * | 4/2004 | Monte et al. .................. 455/13.4 |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 * | 9/2004 | Karabinis ..................... 455/427 |
| 2004/0192395 A1 | 9/2004 | Karabinis |
| 2004/0203393 A1 * | 10/2004 | Chen ............................ 455/63.1 |
| 2004/0203742 A1 | 10/2004 | Karabinis |
| 2004/0229616 A1 | 11/2004 | Dutta et al. |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 * | 2/2006 | Karabinis et al. ............. 455/12.1 |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 * | 5/2006 | Karabinis ..................... 455/13.4 |
| 2006/0111056 A1 | 5/2006 | Dutta |
| 2006/0135058 A1 | 6/2006 | Karabinis |

| | | |
|---|---|---|
| 2006/0135070 A1 | 6/2006 | Karabinis |
| 2006/0165120 A1 | 7/2006 | Karabinis |
| 2006/0189274 A1 | 8/2006 | Karabinis |
| 2006/0189275 A1 | 8/2006 | Karabinis |
| 2006/0189309 A1 | 8/2006 | Good et al. |
| 2006/0194576 A1 | 8/2006 | Karabinis et al. |
| 2006/0205347 A1 | 9/2006 | Karabinis |
| 2006/0205367 A1* | 9/2006 | Karabinis ................. 455/95 |
| 2006/0211371 A1 | 9/2006 | Karabinis et al. |
| 2006/0211452 A1 | 9/2006 | Karabinis |
| 2006/0217070 A1 | 9/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0026867 A1 | 2/2007 | Karabinis |
| 2007/0037514 A1 | 2/2007 | Karabinis |
| 2007/0072545 A1 | 3/2007 | Karabinis et al. |
| 2007/0087690 A1* | 4/2007 | Karabinis ................. 455/12.1 |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0184849 A1 | 8/2007 | Zheng |
| 2007/0192805 A1* | 8/2007 | Dutta et al. ................. 725/64 |
| 2007/0202816 A1 | 8/2007 | Zheng |
| 2007/0232298 A1 | 10/2007 | Karabinis |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0014927 A1* | 1/2008 | Bondyopadhyay ........... 455/427 |
| 2008/0025312 A1* | 1/2008 | Kuppuswamy et al. ...... 370/392 |
| 2008/0032671 A1 | 2/2008 | Karabinis |
| 2008/0032690 A1 | 2/2008 | Karabinis |
| 2008/0069039 A1* | 3/2008 | Li et al. ................. 370/329 |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0242238 A1* | 10/2008 | Singh et al. ................. 455/77 |
| 2008/0268836 A1 | 10/2008 | Karabinis et al. |
| 2008/0268838 A1* | 10/2008 | Zufall et al. ................. 455/430 |
| 2009/0011704 A1 | 1/2009 | Karabinis |
| 2009/0029696 A1 | 1/2009 | Karabinis |
| 2009/0040100 A1 | 2/2009 | Levin et al. |
| 2009/0042509 A1 | 2/2009 | Karabinis et al. |
| 2009/0042516 A1 | 2/2009 | Karabinis |
| 2009/0052357 A1* | 2/2009 | Suo et al. ................. 370/280 |
| 2009/0075645 A1 | 3/2009 | Karabinis |
| 2009/0080386 A1* | 3/2009 | Yavuz et al. ................. 370/337 |
| 2009/0088151 A1 | 4/2009 | Karabinis |
| 2009/0104903 A1 | 4/2009 | Karabinis |
| 2009/0131046 A1 | 5/2009 | Karabinis et al. |
| 2009/0137203 A1 | 5/2009 | Karabinis et al. |
| 2009/0154702 A1* | 6/2009 | Tamura et al. ................. 380/270 |
| 2009/0156154 A1* | 6/2009 | Karabinis et al. ............. 455/307 |
| 2009/0161608 A1* | 6/2009 | Steer et al. ................. 370/329 |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/47147 A1 | 6/2001 |
| WO | WO 01/54314 A1 | 7/2001 |

OTHER PUBLICATIONS

Federal Communications Commission, "Flexibility for Delivery of Communications by Mobile Satellite Service Providers in the 2 GHz Band, the L-Band, and the 1.6/2.4 GHz Bands", 2003, pp. 152-153.
Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.
International Search Report, PCT Application No. PCT/US2005/044122, Jun. 7, 2006.

* cited by examiner

| Type of Environment | Measured Average Power Provided to Terminal Antenna | Ratio of Measured Average Power to Average Power Predicted by Commission's Model |
|---|---|---|
| Dense-Urban | -6.22 dBm | -9.22 dB |
| Urban | -3.55 dBm | -6.55 dB |
| Suburban | 1.56 dBm | -1.44 dB |
| Highway | -1.39 dBm | -4.39 dB |

PREDICTION OF UPLINK INTERFERENCE POTENTIAL GENERATED BY AN ANCILLARY TERRESTRIAL NETWORK AND/OR RADIOTERMINALS

RELATED APPLICATION

The present application is a continuation of U.S. patent application Ser. No. 11/295,383, filed Dec. 6, 2005, and further claims priority to U.S. Provisional Application Ser. No. 60/636,592, filed Dec. 16, 2004 and hereby incorporated by reference herein in its entirety.

FIELD OF THE INVENTION

This invention relates to wireless communications systems and methods, and more particularly to satellite communications systems and methods.

BACKGROUND OF THE INVENTION

Satellite communications systems and methods are widely used for radioterminal communications. Satellite radioterminal communications systems and methods generally employ at least one space-based component, such as one or more satellites, that is/are configured to wirelessly communicate with a plurality of satellite radioterminals.

A satellite radioterminal communications system or method may utilize a single antenna pattern (beam) covering an entire area served by the system. Alternatively, or in combination with the above, in cellular satellite radioterminal communications systems and methods, multiple antenna patterns (beams or cells) are provided, each of which can serve a substantially distinct geographical area in an overall service region, to collectively serve an overall satellite footprint. Thus, a cellular architecture similar to that used in conventional terrestrial cellular/PCS radioterminal systems and methods can be implemented in cellular satellite-based systems and methods. The satellite typically communicates with radioterminals over a bidirectional communications pathway, with radioterminal communications signals being communicated from the satellite to the radioterminal over a downlink or forward link, and from the radioterminal to the satellite over an uplink or return link. The downlink and uplink may be collectively referred to as service links.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth, above the earth and/or in space. A "radioterminal" also may be referred to herein as a "radiotelephone," "terminal", "wireless terminal" or "wireless user device". Furthermore, as used herein, the term "base station" or "ancillary terrestrial component" includes any radiating device that is configured to provide communications service to one or more radioterminals and may have time-varying or fixed geographic coordinates, may be portable, transportable, installed in a vehicle (aeronautical, maritime, or land-based), or situated and/or configured to operate locally and/or in a distributed fashion at any other location(s) on earth, above the earth and/or in space.

Cellular satellite communications systems and methods may deploy hundreds of cells (i.e., antenna patterns), each of which corresponds to one or more spot beams, over a satellite footprint corresponding to a service area. It will be understood that large numbers of cells may be generally desirable, since the frequency reuse and the capacity of a cellular satellite communications system or method may both increase in direct proportion to the number of cells. Moreover, for a given satellite footprint or service area, increasing the number of cells may also provide a higher gain per cell, which can increase the link robustness and improve the quality of service.

The uplink and downlink communications between the wireless terminals and a satellite may utilize one or more air interfaces, including proprietary air interfaces and/or conventional terrestrial cellular interfaces, such as Time Division Multiple Access (TDMA), Orthogonal Frequency Division Multiple Access (OFDMA) and/or Code Division Multiple Access (CDMA) air interfaces. A single air interface may be used throughout the cellular satellite system. Alternatively, multiple air interfaces may be used for the satellite communications. See, for example, U.S. Pat. No. 6,052,560, issued Apr. 18, 2000, entitled Satellite System Utilizing a Plurality of Air Interface Standards and Method Employing the Same, by the present inventor Karabinis. In general, regardless of the air interface or interfaces that are used, each satellite cell generally uses at least one carrier/channel to provide service. Thus, a return service link and/or a forward service link may use one or more carriers/channels to provide service.

The above description has focused on communications between the satellite and the wireless terminals. However, cellular satellite communications systems and methods also generally employ a bidirectional feeder link for communications between a terrestrial satellite gateway and the satellite. The bidirectional feeder link includes a forward feeder link from the gateway to the satellite and a return feeder link from the satellite to the gateway. The forward feeder link and/or the return feeder link each may use one or more carriers/channels.

Terrestrial networks can enhance cellular satellite radioterminal system availability, efficiency and/or economic viability by terrestrially using/reusing at least some of the frequencies that are allocated to cellular satellite radioterminal systems. In particular, it is known that it may be difficult for cellular satellite radioterminal systems to reliably serve densely populated areas, because satellite signals may be blocked by high-rise structures and/or may not penetrate into buildings. As a result, satellite frequencies may be underutilized or unutilized in such areas. The terrestrial use/reuse of at least some of the satellite system frequencies can reduce or eliminate this potential problem.

Moreover, the capacity of a hybrid system, comprising terrestrial and satellite-based connectivity and configured to terrestrially use/reuse at least some of the satellite-band frequencies, may be higher than a corresponding satellite-only system since terrestrial frequency use/reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to use/reuse terrestrially at least some of the frequencies of the satellite band may become more economically viable, as it may be able to serve more effectively and reliably a larger subscriber base.

Satellite radioterminal communications systems and methods that may employ terrestrial use of satellite frequencies are described in U.S. Pat. No. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis, and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite radiotelephone systems and methods may employ interference cancellation techniques to allow terrestrial reuse of satellite frequencies. For example, as described in U.S. Pat. No. 6,684,057, cited above, a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

Other radiotelephone systems and methods can monitor terrestrial reuse of satellite-band frequencies to reduce potential interference. For example, as described in Published U.S. Patent Application No. US 2003/0054814 A1, cited above, radiation by an ancillary terrestrial network, and/or satellite radiotelephones that communicate therewith are monitored and controlled, to reduce and preferably prevent intra-system interference and/or interference with other satellite radiotelephone systems. In particular, a satellite radiotelephone system includes a space-based component that is configured to wirelessly communicate with first radiotelephones in a satellite footprint over a satellite radiotelephone frequency band, and an ancillary terrestrial network that is configured to wirelessly communicate with second radiotelephones in the satellite footprint over at least some of the satellite radiotelephone frequency band, to thereby terrestrially reuse the at least some of the satellite radiotelephone frequency band. Wireless radiation by the ancillary terrestrial network and/or the second radiotelephones at the space-based component is monitored, and the radiation by the ancillary terrestrial network and/or the plurality of second radiotelephones is adjusted in response to the monitoring. Intra-system interference and/or interference with other satellite systems thereby may be reduced or prevented. See the Abstract of U.S. Published Patent Application US 2003/0054814 A1.

Finally, additional systems and methods may be used to monitor terrestrially reused satellite frequencies to reduce potential interference. For example, as described in Published U.S. Patent Application No. US 2003/0073436 A1, cited above, a satellite radiotelephone system includes a space-based component, an ancillary terrestrial network, a monitor and a controller. The space-based component is configured to wirelessly communicate with radiotelephones in a satellite footprint over a satellite radiotelephone frequency band. The satellite footprint is divided into satellite cells in which subsets of the satellite radiotelephone frequency band are spatially reused in a spatial reuse pattern. The ancillary terrestrial network is configured to wirelessly communicate with radiotelephones in the satellite footprint over at least some of the satellite radiotelephone frequency band, to thereby terrestrially reuse the at least some of the satellite radiotelephone frequency band. The monitor is configured to monitor wireless radiation at the space-based component that is produced by the ancillary terrestrial network and/or the radiotelephones in satellite cells that adjoin a satellite cell and/or in the satellite cell, in at least part of the subset of the satellite radiotelephone frequency band that is assigned to the satellite cell for space-based component communications. The controller is configured to adjust the radiation by the ancillary terrestrial network and/or the radiotelephones, in response to the monitor. See the Abstract of U.S. Published Patent Application U.S. 2003/0073436 A1.

A Mobile Satellite System (MSS) 100 is shown in FIG. 1. The MSS 100 includes at least one gateway 102 that includes an antenna 104 and gateway electronics 106 that can be connected to other networks 108 including terrestrial and/or other radiotelephone networks. The gateway 102 also communicates with at least one Space-Based Component (SBC) 110, such as a satellite, over a satellite feeder link 109.

The SBC 110 is configured to transmit wireless communications to a plurality of ancillary terrestrial radioterminals 120a, 120b in a satellite footprint that includes one or more satellite cells 130 over one or more satellite forward link (downlink) frequencies $f_D$. The SBC 110 is configured to receive wireless communications from, for example, a first radioterminal 120a in the satellite cell 130 over a satellite return link (uplink) frequency $f_U$.

The MSS 100 also includes an Ancillary Terrestrial Network (ATN) that includes at least one Ancillary Terrestrial Component (ATC) 140. The ATC 140 can include a base station transceiver that is configured to service radioterminals within its service area cell by terrestrially reusing satellite frequencies that are used by the SBC 110. For example, as shown in FIG. 1, the ATC 140 is configured to transmit wireless communications to a second radioterminal 120b within ATC cell 150 over a satellite downlink frequency $f'_D$ which may be the same as the satellite downlink frequency $f_D$, and to receive from the second radioterminal 120b over a satellite uplink frequency $f'_U$ which may be the same as the satellite uplink frequency $f_U$. Accordingly, the radioterminal 120a may be communicating with the SBC 110 while the radioterminal 120b may be communicating with the ATC 140 over a frequency range that at least partially overlaps. The gateway 102 may communicate with the ATC 140 over a terrestrial link 160.

Because the satellite uplink and downlink frequencies $f_U$, $f_D$, $f'_U$, $f'_D$ may at least partially overlap, communications between the SBC 10 and the first radioterminal 120a can interfere with communications between the second radioterminal and the ATC 140 and vice versa. Moreover, communications between the second radioterminal and the ATC 140 can also interfere with communication by components of another MSS. For example, as shown in FIG. 1, another MSS includes a SBC 170 that communicates with a radioterminal 172 over satellite communication frequencies that at least partially overlap with and/or are adjacent to the satellite uplink and downlink frequencies $f_U$, $f_D$, $f'_U$, $f'_D$ used by the MSS 100. The radioterminal 172 is configured to communicate with the SBC 170 and it may be further configured to terrestrially communicate with an ATN using satellite frequencies such as explained above for the radioterminals 120a-b. The radiated signals from the radioterminals 120a-b and ATC 140 may interfere with communications between the SBC 170 and the radioterminal 172. When MSSs have adjacent or overlapping cells and are owned or controlled by different entities, it may be more difficult to employ some of the interference cancellation techniques described above and such interference to an MSS may be considered more objectionable when it is caused by another MSS owned/controlled by another entity.

The Federal Communications Commission has proposed to reduce/avoid such interference to MSSs through the regulation of the terrestrial use/reuse of satellite frequencies based on an analytical model it developed to define limits on uplink interference potential to an L-band MSS from the deployment of an ATN. See, Report and Order and Notice of Proposed Rulemaking, FCC 03-15, *Flexibility for Delivery of Communications by Mobile Satellite Service Providers in the 2 GHz Band, the L-Band, and the 1.6/2.4 Bands*, IB Docket No. 01-185, Adopted: Jan. 29, 2003, Released: Feb. 10, 2003, hereinafter referred to as "Order FCC 03-15". Also, see Memorandum Opinion and Order and Second Order on Reconsideration, FCC 05-30, In the matter of *Flexibility for Delivery of Communications by Mobile Satellite Service Providers in the 2 GHz Band, the L-Band, and the 1.6/2.4 GHz Bands*, IB Docket No. 01-185, Adopted: Feb. 10, 2005, Released: Feb. 25, 2005.

SUMMARY OF THE INVENTION

Some embodiments of the present invention provide a method of predicting an uplink interference potential to a Mobile Satellite System (MSS) generated by Ancillary Terrestrial Components (ATCs) of an Ancillary Terrestrial Network (ATN) and/or radioterminals (ATC radioterminals) that are configured to terrestrially use/reuse satellite frequencies that are used and/or authorized for use by the MSS. Measurements are made of a power (or a measure thereof) transmitted by and/or received at one or more radioterminals communicating with at least one terrestrial network and/or transmitted by and/or received at the at least one terrestrial network communicating with the one or more radioterminals using terrestrial frequencies that are at least partially outside a range of the satellite frequencies. The uplink interference potential to the MSS generated by terrestrial use/reuse of satellite frequencies by the ATN and/or the radioterminals is predicted responsive to the measured power (or measure of the power). In some embodiments, the measurements of the power (or a measure thereof) transmitted by and/or received at the one or more radioterminals communicating with the at least one terrestrial network and/or transmitted by and/or received at the at least one terrestrial network communicating with the one or more radioterminals are stored in a digital storage medium and subsequently are used by a data reduction algorithm to predict the uplink interference potential.

In some further embodiments, the predicted uplink interference potential may be used to define a maximum output power that can be transmitted by the radioterminals and/or the ATCs when in a geographic area within the radio horizon of (i.e., having a line-of-sight with) the SBC of the MSS, responsive to the predicted uplink interference potential. The predicted uplink interference potential may be used when determining placement of ATC antennas in a geographic area responsive to the predicted uplink interference potential. A maximum number of radioterminals that can simultaneously communicate with the ATCs may be defined based on the predicted uplink interference potential. The predicted uplink interference potential may be used to influence decisions by the radioterminals and/or the ATN of when to carry out handoff of radioterminals between one of the ATCs and a space-based component of the ATN. Selection among differing coding techniques and/or communications modes that are used by the radioterminals and the ATCs for communications therebetween may be influenced based on the predicted uplink interference potential. The predicted uplink interference potential may be used to influence selection of a range of satellite frequencies that are terrestrial used/reused for communications between the radioterminals and the ATN.

In some further embodiments, the prediction of uplink interference potential to the MSS is updated using a transmitted and/or received power measurement from at least one radioterminal and/or the ATN that terrestrially uses/reuses satellite frequencies that are used and/or authorized for use by the MSS. The maximum number of radioterminals that can simultaneously communicate with the ATCs of the ATN may be controlled responsive to the updated prediction of uplink interference potential to the MSS. Selection among a plurality of different coding techniques and/or communications modes used by the radioterminals and the ATCs for communications therebetween may be controlled responsive to the updated prediction of uplink interference potential to the MSS. Selection of a range of satellite frequencies that are terrestrially used/reused for communications between the radioterminals and the ATCs may be controlled responsive to the updated prediction of uplink interference potential to the MSS. A maximum output power from radioterminals and/or the ATCs may be controlled responsive to the updated prediction of uplink interference potential to the MSS.

In some other embodiments of the present invention, an ancillary terrestrial network (ATN) includes a plurality of ATCs and an interference controller. The ATCs are configured to communicate with a plurality of ATC radiotelephones over satellite frequencies that are used and/or authorized for use by a MSS. The interference controller is configured to control the ATCs and/or ATC radiotelephones that communicate with the ATCs responsive to a prediction of uplink interference potential to a MSS based on measurements of power transmitted by and/or received at one or more radioterminals communicating with at least one terrestrial network and/or transmitted by and/or received at the at least one terrestrial network communicating with the one or more radioterminals using terrestrial frequencies that are at least partially outside a range of the satellite frequencies and/or satellite frequencies.

DETAILED DESCRIPTION OF EMBODIMENTS ACCORDING TO THE INVENTION

Figure 1:
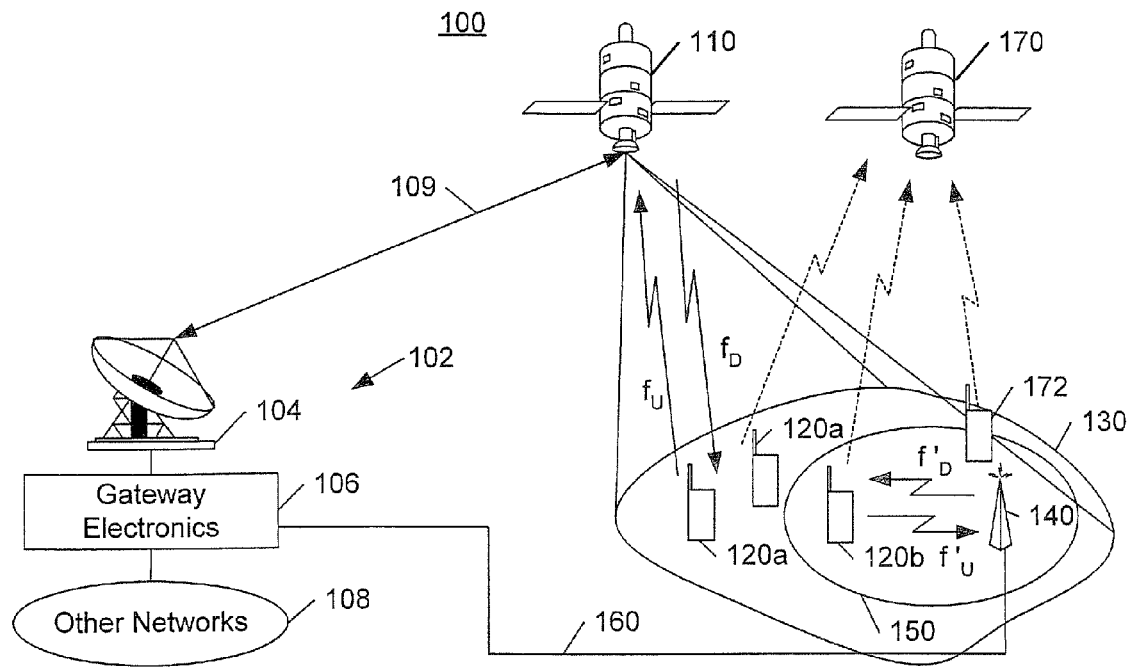
FIG. 1 is a schematic diagram of a mobile satellite system comprising terrestrial use/reuse of at least some frequencies used and/or authorized for use by the mobile satellite system.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first space-based component below could be termed a second space-based component, and similarly, a second space-based component may be termed a first space-based component without departing from the teachings of the present invention. As used herein, the term "and/or" includes any and all combinations of one or more of the associated listed items. The symbol "/" is also used as a shorthand notation for "and/or".

Moreover, as used herein, the term "substantially the same", as applied, for example, to frequency bands, means that two or more frequency bands being compared substantially overlap, but that there may be some areas of non-overlap, for example at a band end and/or elsewhere. Moreover, the term "substantially the same", as applied to air interfaces, means that two or more air interfaces (i.e., wireless protocols) being compared are similar but need not be identical. A first air interface, for example, may be based on and may be similar with (in at least one protocol layer) a second air interface. Some differences may exist in one air interface relative to another air interface to, for example, accommodate, adjust and/or compensate one or more aspects/concerns/differences that may be associated with, for example, a satellite system relative to a terrestrial system, a first satellite system relative to a second satellite system, a first terrestrial system relative to a second terrestrial system and/or for any other reason(s). For example, a first vocoder rate such as, for example, 4 kbps or 2 kbps, may be used by a first air interface that is providing satellite communications compared to a second vocoder rate (e.g., 12 kbps, 16 kbps or 32 kbps) that may be used by a second air interface that is providing terrestrial communications. Different forward error correction codes, different interleaving depths, different carrier/channel bandwidths and/or different spread-spectrum codes, etc., may also exist between two or more "substantially the same" air interfaces as long as each of the two or more air interfaces comprises a common essential element (i.e., a kernel).

As explained above, the Federal Communications Commission has proposed in Order FCC 03-15 to reduce/avoid uplink interference to L-band MSSs through the regulation of the terrestrial use/reuse of satellite frequencies based on an analytical model (referred to herein as "Commission's model") it developed that defines uplink interference limits. In the ATC Order, the Commission used its analytical model to define limits on ATN deployment in the United States such that the uplink interference potential (as defined by the Commission's model) to a co-channel L-band MSS may not exceed 0.7% $\Delta T/T$. See Order FCC 03-15, Appendix C2, Table 2.1.1.C, at 206. In defining uplink interference, the Commission's model takes into account several interference mitigation mechanisms, such as outdoor blockage, power control, vocoder factor, voice activity, and polarization isolation. The largest interference mitigation contributor is power control to which the Commission's model attributes 20 dB of average interference suppression. The remaining interference mitigation mechanisms (outdoor blockage, vocoder factor, voice activity, and polarization isolation) are assigned significantly lower average values: Outdoor blockage=3.1 dB; vocoder factor=3.5 dB; voice activity=1 dB; polarization isolation=1.4 dB.

According to the Commission's model for power control, a radioterminal that is operating outdoors will emit, on average, 20 dB less than its maximum Effective Isotropic Radiated Power (EIRP). Thus, for example, if a GSM radioterminal is manufactured to a specification of 0 dBW maximum EIRP (as the Commission's model in Order FCC 03-15 assumes), the radioterminal will only emit −20 dBW (+10 dBm) average EIRP when operating outdoors. Similarly, for a CDMA radioterminal that is manufactured, for example, to a specification of −7 dBW maximum EIRP (See cdma2000 specifications), the radioterminal will emit −27 dBW (+3 dBm) average EIRP when operating outdoors.

Some embodiments of the present invention may arise from a recognition that the amount of interference to an MSS that is generated by ATCs of an ATN and/or by ATC/ATN radioterminals that terrestrially use/reuse satellite frequencies can vary significantly based on variation in the environment of the geographic areas of deployment. Moreover, because of the significance of power control in the determination of uplink interference potential to an MSS, the accuracy of predicting uplink interface may be significantly improved by basing the prediction, at least in part, on actual measurements of radiated power by one or more radioterminals and/or terrestrial networks in an area that may at least partially be visible by a "victim" MSS. As will be appreciated, improving the uplink interference prediction may enable more effective planning for deployment of ATNs and control of existing ATNs.

Accordingly, some embodiments of the present invention can predict uplink interference potential that is generated by an ATN and/or radioterminals that terrestrially use/reuse satellite frequencies based on measurements of radiated power from one or more radioterminals and/or one or more terrestrial networks that communicate using terrestrial frequencies that are at least partially outside a range of the satellite frequencies. The terrestrial frequencies may be, for example, cellular and/or PCS frequencies used by wireless telephone networks. In some embodiments, the output power and/or received power of a cellular and/or PCS radioterminal, which may be operated outdoors, and/or of a terrestrial network may be measured as the radioterminal traverses routes in a given area. An average output power level and/or an average received power level of the radioterminal and/or terrestrial network may then be derived from the measurements. The measured output and/or input power levels may then be used to predict the uplink interference potential that will be generated by an ATN and/or radioterminals that terrestrially use/reuse satellite frequencies in the given area. The prediction may further use mathematical analysis, simulation and/or modeling techniques, such as to interpolate and/or extrapolate among the measured power levels and associated geographic locations where the measurements were taken. Moreover, after the ATN is actually deployed, the prediction may be updated and/or refined using measurements that are taken from one or more actual radioterminals that are communicating with the ATN by terrestrially using/reusing satellite frequencies.

In an exemplary embodiment of the present invention, Mobile Satellite Ventures, LP (MSV), the assignee of the present application, commissioned LCC International, Inc. ("LCC") to conduct measurements in the Washington D.C. area using an existing PCS network and radioterminal equipment thereof using PCS terrestrial frequencies that are outside a range of satellite frequencies to predict the potential for uplink interference to a MSS that may be generated by terrestrial use/reuse of satellite frequencies in that area by an ATN and/or radioterminals thereof. The measurements by LCC were also compared to what was defined by the Commission's model to assess the differences therebetween.

More particularly, LCC recorded the output power of a cdma2000 radioterminal as it was driven around in dense-urban, urban, suburban, highway, and even rural environments in the Washington D.C. area, while communicating with radio base stations of a PCS network, including while the radioterminal was handed-off at times from one base station to another. The data recorded by LCC represented the power delivered to the antenna port of the radioterminal by the Power Amplifier (PA) of the radioterminal. This quantity, as recorded, included the effect of power control but did not include the effect of voice activity (because a continuous voice stream was applied to the terminal).

It was determined that for a cdma2000 radioterminal operating outdoors and having a maximum output power capability of approximately −7 dBW the Commission's model defined an average emitted power of +3 dBm (−27 dBW), for a Washington D.C. dense-urban area, while the data recorded by LCC indicated that the average PA output of the radioterminal was −6.22 dBm, which is 9.22 dB less than that predicted by the Commission's model. Consequently, even if the spatially-averaged antenna gain of the radioterminal is 0 dBi, although unlikely, the Commission's model appears to be very conservative by overstating, at least for the Washington D.C. area having a dense-urban environment, the interference to an MSS by the terrestrial use/reuse of satellite frequencies in that area.

It was also found that for a Washington D.C. urban area tested, the average power output of the radioterminal PA was −3.55 dBm, which is 6.55 dB less than the Commission's model defined. Again, even if the spatially-averaged antenna gain of the radioterminal is 0 dBi, it appears that the Commission's model is again very conservative by overstating, for the Washington D.C. urban environment, the interference to an MSS by the terrestrial use/reuse of satellite frequencies. For a Washington D.C. suburban area that was tested. it was found that the average power output of the radioterminal PA was 1.56 dBm, which is 1.44 dB less than the Commission's model defined. For the highway routes that were tested, it was found that the average power output of the radioterminal PA was −1.39 dBm, which is 4.39 dB less than the Commission's model defined. Finally, for the rural area that was tested, it was found that the average power output of the terminal's PA was 5.07 dBm, which is 2.07 dB more than the Commission's model defined.

Figures 2, 3:
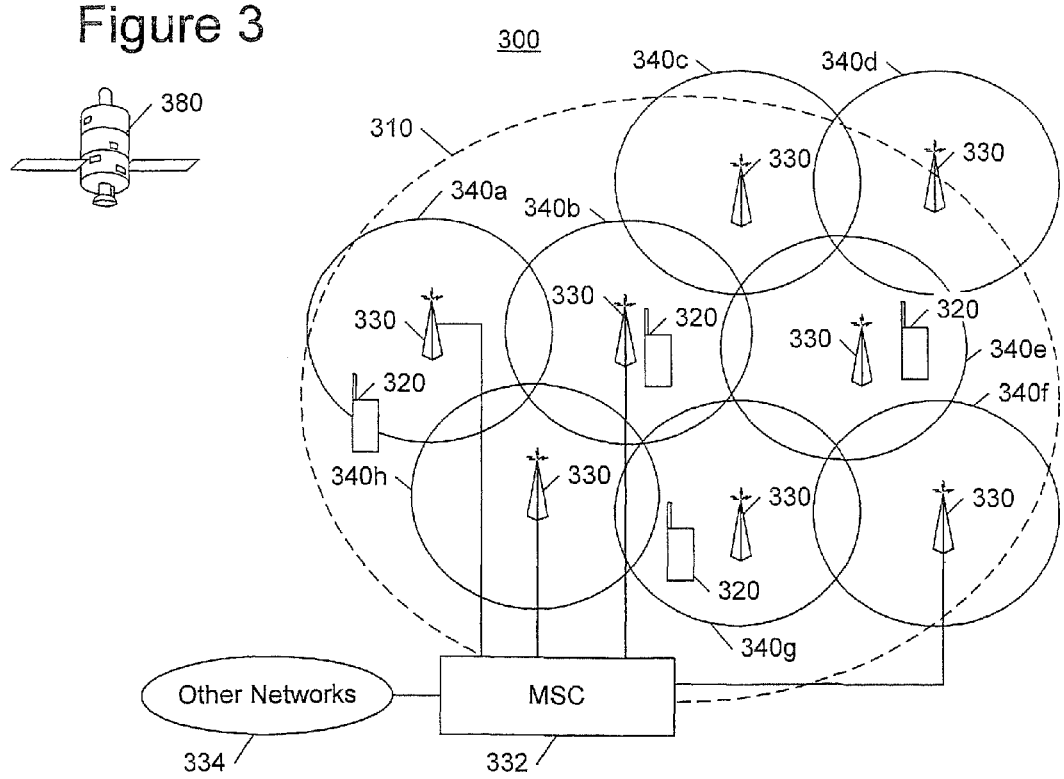
FIG. 2 is a table that compares power level measurements gathered in different environments of the Washington D.C. area, in accordance with some embodiments of the present invention, compared to what is defined by the Federal Communication Commission's model in Order FCC 03-15.
FIG. 3 is a schematic diagram that illustrates a communications system and methods that predict uplink interference potential according to some embodiments of the present invention.

The data was collected while a continuous voice stream was applied to the radioterminal. Accordingly, as explained above, the measurements recorded by LCC do not include the effect of variation in voice activity on the average output power of the radioterminal. The measurements do, however, include the effect of a user's body on the radiated signals, which was simulated by taking the measurements while the radioterminal was strapped to a side of a simulated human head. The simulated head was filled with materials designed to exhibit RF absorption properties substantially similar to a human head. The radioterminal compensated for the absorptive characteristics of the simulated head by radiating, on average, a 3 dB higher power level. See *Effects on Portable Antennas of the Presence of a Person*, IEEE Transactions on Antennas and Propagation, Vol. 41, No. 6, June 1993. Although the Commission's model does not account for the effect of a user's body on the radiated signals in its definition of the average output power of a radioterminal, the measurements recorded by LCC, which included the effect of a human head, are consistently lower (with the exception of the rural environment) than the levels defined by the Commission's model. As explained above, the Commission's model defined 9.22 dB and 6.55 dB higher output power than was actually measured for the dense-urban and urban environments, respectively. For suburban and highway environments, the Commission's model defined 1.44 dB and 4.39 dB higher power levels, respectively, than was actually measured. FIG. 2 is a table that compares the LCC measurements in the tested environments of the Washington D.C. area to what is defined by the Commission's model.

It appears from the LCC measurements that the Commission's model overstates the average output power of a radioterminal for all types of environments where ATN may be deployed. Consequently, if an ATN were to be deployed in the Washington D.C. area with at least some ATC base stations substantially co-located with and/or using the same tower infrastructure of the PCS network base stations that were involved in the LCC measurements of the dense-urban, urban, suburban, and/or highway environments, the average level of uplink interference that would be generated by a radioterminal operating outdoors would be less, and may be significantly less, than the level of uplink interference that would be defined by the Commission's model. This finding may be significant in reducing and/or minimizing a deployment cost of the ATN associated with establishing base station sites (i.e., ATC sites). Accordingly, an ATN comprising a plurality of ATCs may be deployed such that at least one (and preferably many, if not all) of the ATC base stations (i.e., the ATCs) are substantially co-located with and/or use the same base station tower infrastructure of one or more existing cellular/PCS networks. Moreover, because the measurements of radioterminal output power were taken with a PCS terminal communicating with terrestrial network base stations at PCS frequencies, and propagation loss with distance in the L-band is less compared to propagation loss with distance at PCS frequencies, additional interference suppression will be afforded by an L-band ATN.

The measurements recorded by LCC using PCS frequencies were carried out without use of any special-purpose vocoder, under any conditions. In particular, under all conditions, the radioterminal communicated with the PCS network base stations using an Enhanced Variable Rate Codec (EVRC) which is standard in cdma2000 networks. This finding may be significant for it implies that ATN/ATC radioterminals may be configured to communicate with ATN/ATC infrastructure (i.e., ATN/ATC base stations) using a substantially standard cellular/PCS vocoder without generating more interference potential to a MSS than the Commission's model predicts/allows. Accordingly, improved voice communications may be provided by an ATN by configuring the ATN base stations and/or the ATN radioterminals to provide voice communications using vocoder(s) that are substantially identical to vocoder(s) used by other (non-ATN) wireless networks. In view of the above, it appears that the ATN base stations and/or ATN radioterminals may also be configured to provide additional modes of communications (i.e., in addition to voice communications) that are also substantially identical (and possibly superior) to modes of communications used by other (non-ATN) wireless networks. In some embodiments, the additional modes of communications may comprise circuit-switched and/or packet-switched data modes (that may be high-speed circuit-switched and/or high-speed packet-switched data modes), multi-media content data modes and/or broadcast modes. Accordingly, ATN base stations (i.e., ATCs) and/or ATN/ATC radioterminals may be configured to communicate therebetween using frequencies of a satellite band and an air interface protocol that is substantially the same as and/or based on a wireless air interface protocol that is used by a wireless system that provides communications using frequencies that are substantially different than the frequencies of the satellite band. The wireless air interface protocol that is used by the wireless system that provides communications using frequencies that are substantially different than the frequencies of the satellite band may be a cdma2000, W-CDMA, GSM, OFDM/OFDMA, hybrid CDMA/TDMA/OFDMA, Frequency Division Duplex (FDD), Time Division Duplex (TDD) and/or any derivative thereof including circuit-switched, packet-switched and/or push-to-talk communications capability and/or any other protocol that may be currently specified, in the process of being specified and/or may be specified in the future. In view of the overstated interference predictions defined by the Commission's model, it appears that an ATN that is authorized/allowed to generate up to X% noise increase and/or a certain overload potential to a MSS, may, in actual (real-world) operation, generate less interference to the MSS. Therefore, even if 3 dB of interference suppression is lost due to a satellite being located at a high elevation relative to the geographic coverage area of an ATN, the Commission's model would still appear to overstate the level of interference compared to that predicted by the LCC measurements.

Although the Commission's model is based on 18 dB of structural attenuation margin, it is noted that not all base stations that were involved in the LCC measurements likely provided 18 dB of structural attenuation margin. In the dense-urban and urban environment areas, most terrestrial network base stations may be expected to provide 18 dB of structural attenuation margin. In contrast, in the suburban and highway environment areas, most terrestrial network base stations may be expected to provide less than 18 dB structural attenuation margin. However, the LCC measurements indicate that even in such environment areas the average output power of a radioterminal likely would not exceed the Commission's model definition that a radioterminal would on average not radiate more than 20 dB below the maximum transmission power of the radioterminal when operating outdoors.

The methodology of gathering empirical data of a radioterminal's output power in outdoor environments, as explained above, and/or gathering empirical data of a network's output power allows estimating the uplink interference potential of a specific ATN deployment to a MSS even before the ATN is deployed, in accordance with various embodiments of the present invention. The geographic area (s) in which data is to be gathered can be determined by selecting cells of an existing terrestrial network that at least partially overlap a planned deployment area of an ATN. The selected cells can, for example, include conventional PCS/cellular base stations that communicate using terrestrial frequencies at least partially outside a range of the satellite frequencies of the proposed ATN. The empirical data gathered from the selected cells of the existing terrestrial network is used to estimate the uplink interference potential to a Space-Based Component (SBC) of a MSS that at least partially sees (i.e., has a radio horizon that at least partially includes) the ATN deployment area. Further exemplary embodiments of methods and computer program products for predicting uplink interference potential to a MSS (i.e., to a SBC 380 of a MSS) having a radio horizon spanning an area on the ground that at least partially overlaps an ATN deployment area 310 will now be explained with reference to FIGS. 3 and 4.

Figure 4:
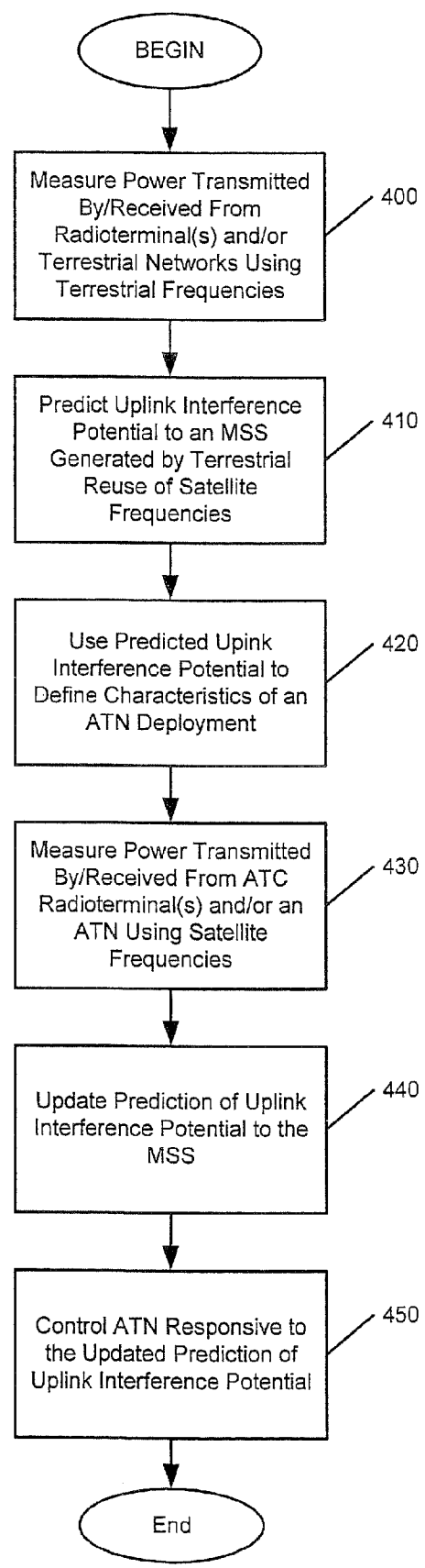
FIG. 4 is a flowchart of operations and methods for predicting the uplink interference potential to a MSS according to some embodiments of the present invention.

FIG. 3 illustrates a terrestrial communications network 300 that includes a plurality of radioterminals 320, network base stations 330, and one or more mobile switching centers (MSC) 332 that route communications among the base stations 330 and other networks 334. FIG. 4 is a flowchart of operations for predicting an uplink interference potential to a SBC 380 of a MSS. Although not illustrated in FIG. 3, it is to be understood that the terrestrial network 300 would typically include other components, such as, for example, base station controllers. The base stations 330 are configured to communicate with the radioterminals 320 within their respective cells 340a-h using terrestrial frequencies that are at least partially outside a range of satellite frequencies used by the SBC 380 of the MSS. For example, the terrestrial frequencies may be within a range of frequencies allocated to wireless telephone networks, such as the cellular/PCS bands, while the SBC 380 of the MSS may communicate with radioterminals (not shown in FIG. 3) using satellite frequencies of, for example, an L-band and/or S-band. Although the ATN deployment area 310 and cells 340a-h have been illustrated as arcuate geographic areas for ease of illustration, it is to be understood that they may each have any shape and that such shapes may change over time responsive to, for example, variation of radiated power by the base stations 330 and/or radioterminals 320, variation in coding used for communications, and/or environmental conditions. Moreover, it is to be understood that the ATN deployment area 310 may overlap any number of cells.

The power level that is transmitted by and/or received from the radioterminals 320 and/or the base stations 330 is repetitively measured over time, Block 400 (FIG. 4). More particularly, the power levels of signals transmitted by one or more radioterminal(s) 320 may be measured at the radioterminal(s) 320, such as at an output of a power amplifier(s) as explained above, and/or at the receiving base station(s) 330 as a received signal strength indication (RSSI). Similarly, the power levels of signals transmitted by the base station(s) 330 may be measured at the base station(s) 330 and/or at the receiving radioterminal(s) 320 as RSSI.

A time series of power level measurements can be made while the radioterminal(s) 320 are moved across at least some of the cells 340a-h to measure a sensitivity to variation in distance between the radioterminal(s) 320 and the communicating base station(s) 330, handoff of the radioterminal(s) 320 between different base stations 330, and/or variation in the amount of blockage of communications signals experienced in communications between the base station(s) 330 and the radioterminal(s) 320.

The time series of power level measurements can additionally or alternatively be measured over time while the base station(s) 330 and/or radioterminal(s) 320 are subjected to differing levels of communications traffic therebetween and/or while the base station(s) 330 and radioterminal(s) 320 selectively use different coding and/or communications modes over time in their communications. In some embodiments, the ratio of active communications time to idle time may be varied to measure the effect of communications traffic on the radiated power level(s). In some other embodiments, the power level measurements may be made while the base station(s) 330 and/or radioterminal(s) 320 selectively use different ones of a plurality of different vocoders to encode and decode voice communications therebetween.

Accordingly, the radioterminal(s) 320 may be moved (e.g., walked and/or driven) around the ATN deployment area 310 within one of the cells 340a-h and/or through one or more of the cells 340a-h while gathering data from a time series of power level measurements at the radioterminal(s) 320 and/or at the base station(s) 330. Moreover, a level of communications traffic, communications mode and/or coding used in the communications can be varied while gathering the power level measurement data. The measurement data may include information that indicates the geographic location of the radioterminal(s) 320, the communications traffic level, communications mode and/or the coding used during communications at the time of each of the power level measurements. The radioterminal(s) 320 may determine and store a geographic location(s) at a time of a power level measurement(s) based on, for example, reception and/or processing of signals of a global position system by the radioterminals 320, and/or based on triangulation of signals (i.e., time of flight) received by the radioterminals 320 from a plurality of base stations 330. Alternatively or additionally, the radioterminal(s) 320 may be informed of a geographic location based on triangulation of signals received at a plurality of the base stations 330 from respective ones of the radioterminal(s) 320.

The uplink interference potential to the SBC 380 of the MSS by the terrestrial use/reuse of satellite frequencies by an ATN in the ATN deployment area 310 can be predicted (Block 410 of FIG. 4) based on the power level measurement data. In some embodiments, the power level measurement data is mapped through the recorded geographic locations to the ATN deployment area 310. The ATN deployment area 310 may then be sub-divided into sub-areas and the power level measurement data therein may be combined to determine, for example, a combined aggregate radiated power level, an average radiated power level, and/or a range of radiated power levels for each of the sub-areas. The uplink interference potential to the MSS 380 by deployment of an ATN in each of the sub-areas can then be predicted based on the associated power level measurement data combined for each of the sub-areas.

The prediction of uplink interference potential based on the power level measurement data can be adjusted to compensate for the differences that may occur in a dissipation and/or propagation loss of radiated power at the range of terrestrial frequencies used by the radioterminal(s) 320 and base station(s) 330 during the collection of power level measurement data compared to the dissipation and/or propagation loss of radiated power at the range of satellite frequencies that will be used by an ATN that will be deployed in area 310. Accordingly, the effect of the frequency differences between the terrestrial frequencies and the satellite frequencies on dissipation and/or propagation loss of radiated power can be estimated and used to more accurately predict uplink interference potential at the satellite frequencies.

The predicted uplink interference potential to the MSS 380 may be used to define characteristics of an ATN that will be at least partially deployed in the area 310. For example, the ATN deployment area 310 can be subdivided into geographic areas that approximate the expected coverage area of ATC base stations that may be deployed as part of the ATN in area 310. The combined power level measurement data in each of the sub-areas can be adjusted based on a maximum number of radioterminals that will be allowed to simultaneously communicate with an ATC in the sub-area. For example, where the combined power level measurement data for a sub-area is representative of radiated power by a single radioterminal, that data may be scaled upward to represent an aggregate power that is expected to be radiated when a maximum number of radioterminals are operating in that sub-area. The scaled and combined power level measurement data for each sub-area can be used to predict the uplink interference potential by ATC(s) and/or radioterminals in the sub-area, and can be compared to limits on the allowable uplink interference for that sub-area and/or for the overall ATN deployment area 310 to determine whether the planned ATN deployment within certain ones of the sub-areas and/or within an entire geographic area, such as, for example, a geographic area associated with a State or a collection of States, would generate more than an allowable uplink interference potential.

The operational characteristics of the planned ATN may be varied on a sub-area by sub-area based on the predicted uplink interference potential for the respective sub-area and the associated constraints on the allowed uplink interference. The maximum number of radioterminals that will be allowed to simultaneously communicate with an ATC in different ones of the sub-areas (e.g., the maximum number of simultaneously traffic calls) may be increased when the predicted uplink interference potential is at least a threshold amount below an allowable limit and may be decreased when the predicted uplink interference is at least a threshold amount above the allowable limit. The maximum output power that will be allowed to be transmitted by radioterminals and/or the ATC in different ones of the sub-areas may be varied based on the predicted uplink interference potential for the respective sub-areas, such as by increasing the maximum allowable output power when the predicted uplink interference potential is at least a threshold amount below the allowable limit and decreasing the maximum allowable output power when the predicted uplink interference is at least a threshold amount above the allowable limit. The number of ATC base station antennas allowed in each of the sub-areas may be defined based on the predicted uplink interference in the respective areas and/or the location of ATC base station antennas in the respective sub-areas may be defined based on the predicted uplink interference. Accordingly, the predicted uplink interference can be used to define or adjust the geographic area over which the deployed ATN may provide communications coverage for radioterminals and/or to define or adjust an architecture associated with the ATN.

The predicted uplink interference may be used to define in the planned ATN, such as in an MSC of the planned ATN, when to carry out handoff of radioterminals between an ATC of the ATN and a SBC of the ATN. For example, a sub-area that has a relatively high predicted uplink interference potential may handoff radioterminals from ATCs in that sub-area to a SBC when a first threshold handoff value of radioterminals need to simultaneously communicate therein, and another sub-area that has a relatively low predicted uplink interference potential may handoff radioterminals from ATCs in that sub-area to the SBC when a second threshold handoff value of radioterminals, which is higher than the first threshold value, need to simultaneously communicate. The threshold handoff values may be increased when the predicted uplink interference potential is less than a threshold interference value, and may be decreased when the predicted uplink interference potential is greater than a threshold interference value.

The predicted uplink interference may be used to influence selection among differing coding techniques and/or communications modes that are used by the radioterminals and the ATC for communications therebetween. For example, ATCs in a first sub-area that has a relatively high predicted uplink interference potential may communicate with radioterminals in the first sub-area using coding and/or a communications mode that enables use of a lower transmission power, and ATCs in a second sub-area that has a relatively low predicted uplink interference potential may communicate with radioterminals in the second sub-area using coding and/or a communications mode that may use a higher transmission power.

The predicted uplink interference may be used to influence a selection of a range of satellite frequencies for terrestrial use/reuse to provide communications between radioterminals and an ATN or a portion thereof. For example, ATCs in a first sub-area that has a relatively high predicted uplink interference potential may allow radioterminals to use/reuse a first range of satellite frequencies with the ATCs in the first sub-area, and ATCs in a second sub-area that has a relatively low predicted uplink interference potential may allow radioterminals to use/reuse a second range of satellite frequencies with the ATCs in the second sub-area. In some embodiments, the first range may have a measure associated therewith that is smaller to a corresponding measure associated with the second range. In some embodiments, the measure may be a frequency reuse measure.

After the ATN is deployed (partially or in its entirety), the output power of the radioterminal(s) and/or ATCs in deployment area 310 can be measured (Block 430 of FIG. 4), and may be used to update the predicted uplink interference potential to the MSS 380 (Block 440 of FIG. 4). For example, a time series of the output power transmitted and/or received by the radioterminal(s) and/or the ATCs may be measured and averaged to determine the average output power in the overall area 310 and/or within sub-areas therein. The average output power may be used to update the predicted uplink interference potential to the SBC 380 of the MSS so as to more accurately reflect the predicted uplink interference potential. The average output power may be scaled based on the maximum number of radioterminals that can simultaneously communicate with ATCs of the ATN, and used to update the predicted uplink interference potential. The predicted uplink interference potential may also be updated based on a level of communications traffic that was communicated between the radioterminal(s) and the ATC(s) during the power level measurements. The predicted uplink interference potential may also be updated based on which of a plurality of different coding techniques and/or communications mode(s) were used for communications between the radioterminal(s) and the ATC(s) during the power level measurements. For example, updating of the predicted uplink interference potential may be responsive to which of a plurality of different vocoders was used by the radioterminal(s) and the ATC(s) to encode and decode voice communications therebetween.

Figure 5:
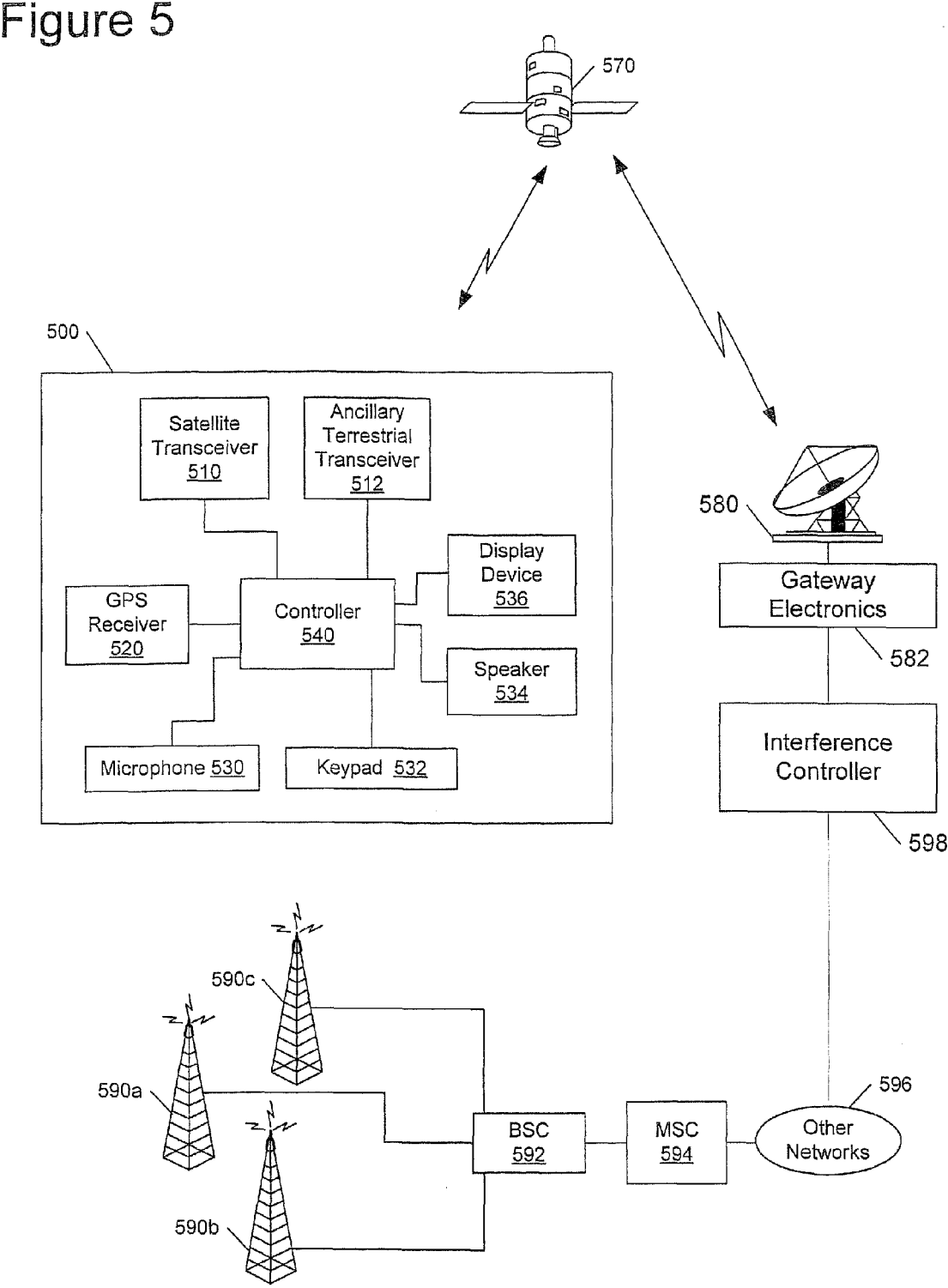
FIG. 5 is a block diagram of a communications system and methods that is/are configured in accordance with some embodiments of the present invention.

The updated prediction of uplink interference potential may then be used to control the ATN (Block 450 of FIG. 4). Such use of the updated prediction of uplink interference potential will be explained with regard to the exemplary MSS shown in FIG. 5. The MSS includes a plurality of radioterminals 500 (only one of which has been shown for ease of illustration), a SBC 570, an antenna 580, gateway electronics 582, a plurality of ATC base stations 590*a-c* that are controlled by a base station controller (BSC) 592, an MSC 594, and an interference controller 598. The SBC 570, antenna 580 and gateway electronics 582 may operate in a conventional manner such as was described with regard to the corresponding components of FIG. 1. The radioterminal(s) 500, at least one ATC(s) 590*a-c*, the BSC 592 and/or any other component internal or external to the system illustrated in FIG. 5 is/are configured to gather a time series of measurements of an output power that is transmitted and/or received by at least one radioterminal 500 and/or at least one ATC 590a-c. Based on the measurements of the output power that is transmitted and/or received by the at least one radioterminal 500 and/or the at least one ATC 590a-c an updated prediction of the uplink interference potential may be made, as described earlier.

The interference controller 598 is configured to use the updated prediction to control a maximum number of radioterminals 500 that are allowed to simultaneously communicate with the ATCs 590a-c, to control an aggregate maximum output power that will be allowed to be transmitted by the radioterminals 500 and/or the ATCs 590a-c, to control when the radioterminals 500 are handed-off from one or more of the ATCs 590a-c to the SBC 570 (and/or from the SBC 570 to one or more of the ATCs 590a-c), to influence selection among differing coding techniques and/or communications modes that are used by the radioterminals 500 and the ATCs 590a-c for communications therebetween, and/or to influence a selection of a range of satellite frequencies that are terrestrially used/reused for communications between the radioterminals 500 and the ATCs 590a-c. The interface controller 598 may also be configured to carry out the operations described above with regard to Block 450 of FIG. 4.

The radioterminals 500 may include a satellite transceiver 510, an ancillary terrestrial transceiver 512, a GPS receiver 520, a microphone 530, a keypad 532, a display device 536, a speaker 534, and a controller 540 which may be connected these and other components. Although the radioterminal 500 has been illustrated with separate satellite transceiver 510 and ancillary terrestrial transceiver 512, the transceivers 510, 512 may be combined where, for example, the combined transceiver is configured to communicate with the SBC 570 and ATCs 590a-c using substantially the same range of frequencies and/or components (i.e., antenna element(s), Power Amplifier (PA), Low Noise Amplifier (LNA), filter(s), down-/up-converter(s) and/or other signal processing elements). The satellite transceiver 510 is configured to communicate with the SBC 570 over satellite frequencies. The ancillary terrestrial transceiver 512 is configured to communicate with the ATCs 590a-c by using/reusing at least some of the frequencies used and/or authorized for use by the SBC 570. The GPS receiver 520 is configured to determine the position of the radioterminal 500 based on signals received and/or processed from a global satellite positioning system. The controller 540 may be configured to vary an output power emission of radioterminal 500 responsive to a power control command(s). The power control command(s) may be generated by the interference controller 598 based on the updated uplink interference prediction and communicated to the controller 540 via one or more networks 596, the MSC 594, the BSC 592, and one or more of the ATCs 590a-c. The controller 540 may also be configured to gather a time series of measurements of an output power level of radioterminal 500, a power level of signals received from at least one of the ATCs 590a-c at the radioterminal 500 and/or a geographic location associated with at least one of the measurements, and may be configured to communicate a representation of the measured output power levels and/or associated locations to the ATCs 590a-c for use by the interference controller 598. In some embodiments, the interference controller 598 may be architecturally situated differently than illustrated in FIG. 5 (i.e., the interference controller 598 may be directly connected to and/or be an integral part of an ATC 590a-c, BSC 592, MSC 594 and/or any other system element that may not be shown in the illustrative system block diagram of FIG. 5). In other embodiments, the interference controller 598 may be external to the system illustrated in FIG. 5.

Accordingly, the methodology of gathering empirical data of a output power measures of a radioterminal in outdoor environments, as presented above, allows estimating the uplink interference potential of a specific ATN deployment even before the ATN is deployed, according to various embodiments of the present invention. In particular, given an area type (i.e., dense-urban) that is currently being served by conventional PCS/Cellular base stations, the output power of a conventional PCS/Cellular radioterminal, operating outdoors, may be measured as the radioterminal is driven and/or otherwise carried around over one or more (and preferably a dense grid of) routes spanning the area. The time series of measurements thus gathered may be averaged to derive an average output power level for the radioterminal. For a desired ATN deployment spanning all or some of the measured area, uplink interference potential may be estimated even prior to the ATN deployment by using, for example, the average output power measured. After the ATN is deployed, specific knowledge of the simultaneous on-the-air ATN traffic over the given area, in conjunction with an average output power of a radioterminal may allow accurate monitoring/prediction of an uplink interference potential. Thus, after the ATN is deployed, an average radioterminal power may be measured again using the ATN infrastructure itself to further refine the original estimate of uplink interference potential. The ATN and/or radioterminals may then be controlled responsive to the updated estimate of uplink interference potential. It will be understood by those skilled in the art that although prediction of interference potential has been presented herein relative to a MSS, the methods/techniques disclosed herein may also be applied to prediction of interference potential relative to any other system (terrestrial or space-based).

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of predicting uplink interference potential to a satellite system generated by infrastructure and/or radioterminals communicating therewith that is/are configured to use/reuse satellite frequencies, the method comprising:

measuring first power transmitted by and/or received at one or more radioterminals communicating with infrastructure using at least some frequencies other than the satellite frequencies and/or measuring second power transmitted by and/or received at the infrastructure communicating with the one or more radioterminals using at least some frequencies other than the satellite frequencies, wherein the power measurement is carried out at a plurality of spaced apart locations over a geographic area that is at least partially within a radio horizon of the satellite system; and predicting uplink interference potential to the satellite system associated with use/reuse of the satellite frequencies by the infrastructure and/or radioterminals communicating therewith responsive to said measuring first power and/or responsive to said measuring second power.

2. A method of predicting uplink interference potential to a satellite system generated by infrastructure and/or radioterminals communicating therewith that is/are configured to use/reuse satellite frequencies, the method comprising:

measuring first power transmitted by and/or received at one or more radioterminals communicating with infrastructure using at least some frequencies other than the satellite frequencies and/or measuring second power transmitted by and/or received at the infrastructure communicating with the one or more radioterminals using at least some frequencies other than the satellite frequencies;

predicting link interference potential to the satellite system associated with use/reuse of the satellite frequencies by the infrastructure and/or radioterminals communicating therewith responsive to said measuring first power and/or responsive to said measuring second power; and using the predicted uplink interference potential to determine placement of infrastructure antennas.

3. The method of claim 2, wherein the at least some frequencies other than the satellite frequencies used by the one or more radioterminals and/or by the infrastructure comprise frequencies that are used to provide terrestrial communications and are not used to provide satellite-based communications.

4. The method of claim 3, wherein the terrestrial communications are associated with a cellular/PCS wireless network.

5. The method of claim 2, further comprising using the predicted uplink interference potential to define a maximum output power that can be transmitted by the radioterminals and/or the infrastructure.

6. The method of claim 2, further comprising limiting a number of the infrastructure antennas deployed in a service region responsive to the predicted uplink interference potential.

7. The method of claim 2, further comprising using the predicted uplink interference potential to define a service region of communications coverage for the infrastructure.

8. The method of claim 2, further comprising using the predicted uplink interference potential to define a maximum number of radioterminals that can simultaneously communicate with the infrastructure.

9. The method of claim 2, wherein measuring first power transmitted by and/or received at the one or more radioterminals and/or measuring second power transmitted by and/or received at the infrastructure comprises measuring a power level transmitted from the one or more radioterminals.

10. The method of claim 2, wherein measuring first power transmitted by and/or received at the one or more radioterminals and/or measuring second power transmitted by and/or received at the infrastructure comprises measuring a power level received by the infrastructure from the one or more radioterminals and/or a power level received by the one or more radioterminals from the infrastructure.

11. The method of claim 2, wherein measuring first power transmitted by and/or received at the one or more radioterminals and/or measuring second power transmitted by and/or received at the infrastructure comprises measuring a power level transmitted from the infrastructure.

12. The method of claim 2, wherein predicting uplink interference potential to the satellite system is further responsive to a maximum number of radioterminals that can simultaneously communicate with the infrastructure.

13. The method of claim 2, wherein measuring first power transmitted by and/or received at the one or more radioterminals and/or measuring second power transmitted by and/or received at the infrastructure comprises measuring power during differing levels of communications traffic between the one or more radioterminals and the infrastructure.

14. The method of claim 2, further comprising updating the prediction of uplink interference potential to the satellite system using a transmitted and/or received power measurement from at least one radioterminal and/or an infrastructure that uses satellite frequencies that are also used and/or authorized for use by the satellite system.

15. The method of claim 14, wherein updating the prediction of uplink interference potential to the satellite system comprises measuring/recording an indication of power that is received at the infrastructure from the at least one radioterminal and/or is transmitted by the at least one radioterminal using satellite frequencies.

16. The method of claim 14, wherein updating the prediction of uplink interference potential to the satellite system comprises measuring/recording an indication of power that is transmitted from the infrastructure in communications with the at least one radioterminal using satellite frequencies.

17. The method of claim 14, wherein updating the prediction of uplink interference potential to the satellite system is further responsive to a maximum number of radioterminals that can simultaneously communicate with the infrastructure.

18. The method of claim 14, wherein updating the prediction of uplink interference potential to the satellite system comprises measuring a transmitted and/or received power of the at least one radioterminal and/or infrastructure during differing levels of communications traffic therebetween.

19. The method of claim 14, further comprising controlling a maximum number of radioterminals that can simultaneously communicate with the infrastructure responsive to the updated prediction of uplink interference potential.

20. The method of claim 14, further comprising controlling selection of a range of satellite frequencies that are terrestrial used/reused for communications between the radioterminals and the infrastructure responsive to the updated prediction of uplink interference potential to the satellite system.

21. The method of claim 14, further comprising controlling a maximum output power from radioterminals and/or the infrastructure responsive to the updated prediction of uplink interference potential to the satellite system.

22. A method of predicting uplink interference potential to a satellite system generated by infrastructure and/or radioterminals communicating therewith that is/are configured to use/reuse satellite frequencies, the method comprising:

measuring first power transmitted by and/or received at one or more radioterminals communicating with infrastructure using at least some frequencies other than the satellite frequencies and/or measuring second power transmitted by and/or received at the infrastructure communicating with the one or more radioterminals using at least some frequencies other than the satellite frequencies;

predicting uplink interference potential to the satellite system associated with use/reuse of the satellite frequencies by the infrastructure and/or radioterminals communicating therewith responsive to said measuring first power and/or responsive to said measuring second power;

using the predicted uplink interference potential to define a maximum number of radioterminals that can simultaneously communicate with the infrastructure;

increasing the maximum number of radioterminals that can simultaneously communicate with the infrastructure when the predicted uplink interference potential is less than a threshold value; and decreasing the maximum number of radioterminals that can simultaneously communicate with the infrastructure when the predicted uplink interference potential is greater than a threshold value.

23. A method of predicting uplink interference potential to a satellite system generated by infrastructure and/or radioterminals communicating therewith that is/are configured to use/reuse satellite frequencies, the method comprising:

measuring first power transmitted by and/or received at one or more radioterminals communicating with infrastructure using at least some frequencies other than the satellite frequencies and/or measuring second power transmitted by and/or received at the infrastructure communicating with the one or more radioterminals using at least some frequencies other than the satellite frequencies; and predicting uplink interference potential to the satellite system associated with use/reuse of the satellite frequencies by the infrastructure and/or radioterminals communicating therewith responsive to said measuring first power and/or responsive to said measuring second power, wherein measuring first power transmitted by and/or received at the one or more radioterminals comprises:

sampling a power level transmitted by and/or received at the one or more radioterminals and/or received at the infrastructure over time; and averaging the samples to generate the measured power.

24. An infrastructure comprising:

a plurality of components that are configured to communicate with a plurality of radioterminals using satellite frequencies; and an interference controller that is configured to control the plurality of components and/or the plurality of radioterminals responsive to a prediction of uplink interference potential to a satellite system based on measurements of first power that is transmitted by and/or is received at one or more radioterminals that is/are communicating with at least one base station of a terrestrial network using frequencies that are at least partially outside a range of the satellite frequencies and/or based on measurements of second power that is transmitted by and/or is received at the at least one base station of the terrestrial network that is communicating with the one or more radioterminals using the frequencies that are at least partially outside of the range of the satellite frequencies, wherein the interference controller is further configured to control a maximum number of radioterminals that can simultaneously communicate with the plurality of components responsive to the prediction of uplink interference potential to the satellite system.

25. The infrastructure of claim 24, wherein the interference controller is further configured to update the prediction of uplink interference potential to the satellite system responsive to measurements of power transmitted by the plurality of components and/or responsive to measurements of power transmitted by the plurality of radioterminals that are communicating with the plurality of components using/reusing the satellite frequencies.

26. The infrastructure of claim 24, wherein the interference controller is further configured to control selection of a range of satellite frequencies that are terrestrially used/reused for communications between radioterminals and the plurality of components responsive to the prediction of uplink interference potential.

27. The infrastructure of claim 24, wherein the interference controller is further configured to control a maximum output power from the plurality of components and/or the plurality of radioterminals communicating with the plurality of components responsive to the prediction of uplink interference potential to the satellite system.

* * * * *